US006285292B1

(12) United States Patent
Suptitz et al.

(10) Patent No.: US 6,285,292 B1
(45) Date of Patent: Sep. 4, 2001

(54) ELECTRONIC TRIP DEVICE COMPRISING AN INITIALIZATION DEVICE

(75) Inventors: Eric Suptitz, Montaud; Pierre Blanchard, Voreppe, both of (FR)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/615,743

(22) Filed: Jul. 13, 2000

(30) Foreign Application Priority Data

Sep. 9, 1999 (FR) .................................................. 99 11440

(51) Int. Cl.⁷ .................................................. G08B 21/00
(52) U.S. Cl. .......................... 340/657; 340/652; 340/650; 340/649; 340/638
(58) Field of Search .................................. 340/657, 652, 340/650, 649, 638

(56) References Cited

U.S. PATENT DOCUMENTS

| | | | |
|---|---|---|---|
| 5,101,316 | 3/1992 | Levain | 361/93 |
| 5,115,371 * | 5/1992 | Tripodi | 361/106 |
| 5,220,479 | 6/1993 | Fraisse | 340/664 |
| 5,367,427 | 11/1994 | Matsko et al. | 361/94 |
| 5,850,330 * | 12/1998 | Perron et al. | 361/103 |
| 5,974,545 * | 10/1999 | Obermeier et al. | 713/1 |
| 6,127,742 * | 10/2000 | Weynachter | 340/638 |

* cited by examiner

*Primary Examiner*—Jeffery Hofsass
*Assistant Examiner*—Hung Nguyen
(74) *Attorney, Agent, or Firm*—Parkhurst & Wendel, L.L.P.

(57) ABSTRACT

The electronic trip device comprises a processing unit comprising protection means, and an initialization device of said processing unit. The initialization device comprises means for initialization after an interruption comprising at least one storage register connected to the protection means to store a value of at least one quantity of a protection function and to supply a value of said at least one quantity when initialization of the processing unit is performed. A back-up power supply circuit supplies the storage register, and means for monitoring the back-up power supply circuit delete the register values when a voltage of the back-up power supply circuit drops below a preset threshold.

7 Claims, 3 Drawing Sheets

ELECTRONIC TRIP DEVICE COMPRISING AN INITIALIZATION DEVICE

BACKGROUND OF THE INVENTION

The invention relates to an electronic trip device comprising:

a processing unit receiving current signals representative of currents flowing in a power system to be protected, comprising protection means and supplying a tripping signal when said currents exceed preset tripping values, and an initialization device for initialization of said processing unit.

In known electronic trip devices, tripping functions give an opening order of the circuit breaker when at least one current flowing in a pole of the circuit breaker exceeds a preset current threshold for a time greater than that corresponding to the tripping curve. Among these functions, the long delay or thermal function, the short delay or magnetic function, and the ground fault protection function can be mentioned.

Certain trip devices comprise thermal memory functions after tripping applied to the long delay function. A trip device of this kind is described in the Patents FR 2,719,169 or U.S. Pat. No. 5,617,078.

In this type of trip device, a storage device simulates the thermal behavior by using the discharge characteristics of a capacitor into a resistor. This device is well suited for a long delay thermal function with tripping and opening of the circuit breaker.

Other trip devices comprise memories to store current values or circuit breaker tripping or status information. These memories are generally RAM supplied with power by a battery or a capacitor of very high value, or EEPROM with electrical write or delete. Management of these memories is associated with tripping and initialization after tripping. If initialization is performed after power supply interruptions due to intermittent faults, it is very difficult to check the integrity of the data contained in the memories.

Thus, for intermittent faults which do not give rise to tripping but which stop the current supply to trip devices, known devices are not efficient.

Moreover, if these intermittent faults are faults processed by short delay or earth protection functions, processing initialization each time the power supply returns would be too onerous and would take too long. For example in the case of a cell with a resistor and a capacitor, one device would be required per type of protection and the charge of the capacitor would have to be controlled permanently.

OBJECT OF THE INVENTION

The object of the invention is to achieve a trip device comprising an initialization device enabling quick initialization of the protection functions and having very reliable initialization values.

In a trip device according to the invention, the initialization device comprises means for initialization after an interruption comprising:

at least one storage register connected to the protection means to store a value of at least one quantity of a protection function and to supply a value of said at least one quantity when initialization of the processing unit is performed, a back-up power supply circuit to supply power to said at least one storage register, means for monitoring the back-up power supply circuit connected to an input of said at least one storage register to reset the value of the register to zero when a voltage of the back-up power supply circuit drops below a preset threshold.

The means for initialization after an interruption preferably comprise a first storage register connected to the protection means and to the monitoring means to store a value of a quantity representative of a short delay protection function.

The means for initialization after an interruption preferably comprise a second storage register connected to the protection means and to the monitoring means to store a value of a quantity representative of an earth protection function.

Advantageously, the means for initialization after an interruption comprise a third storage register connected to the protection means and to the monitoring means to store a value of a quantity representative of a long delay protection function.

In a preferred embodiment, the protection means, at least one storage register, and the monitoring means for monitoring a power supply circuit are arranged in a single integrated circuit.

In a particular embodiment, the back-up power supply circuit comprises a diode connected between a main power supply line and a back-up power supply line, and a capacitor connected between the back-up power supply line and a reference line.

Advantageously, the initialization device comprises means for initialization after an interruption and means for initialization after tripping.

BRIEF DESCRIPTION OF THE DRAWINGS

Other advantages and features of the invention will become more clearly apparent from the following description of particular embodiments of the invention given as non-restrictive examples only and represented in the accompanying drawings in which.

DETAILED DESCRIPTION OF THE PREFERRED EMBODIMENTS

Figure 1:
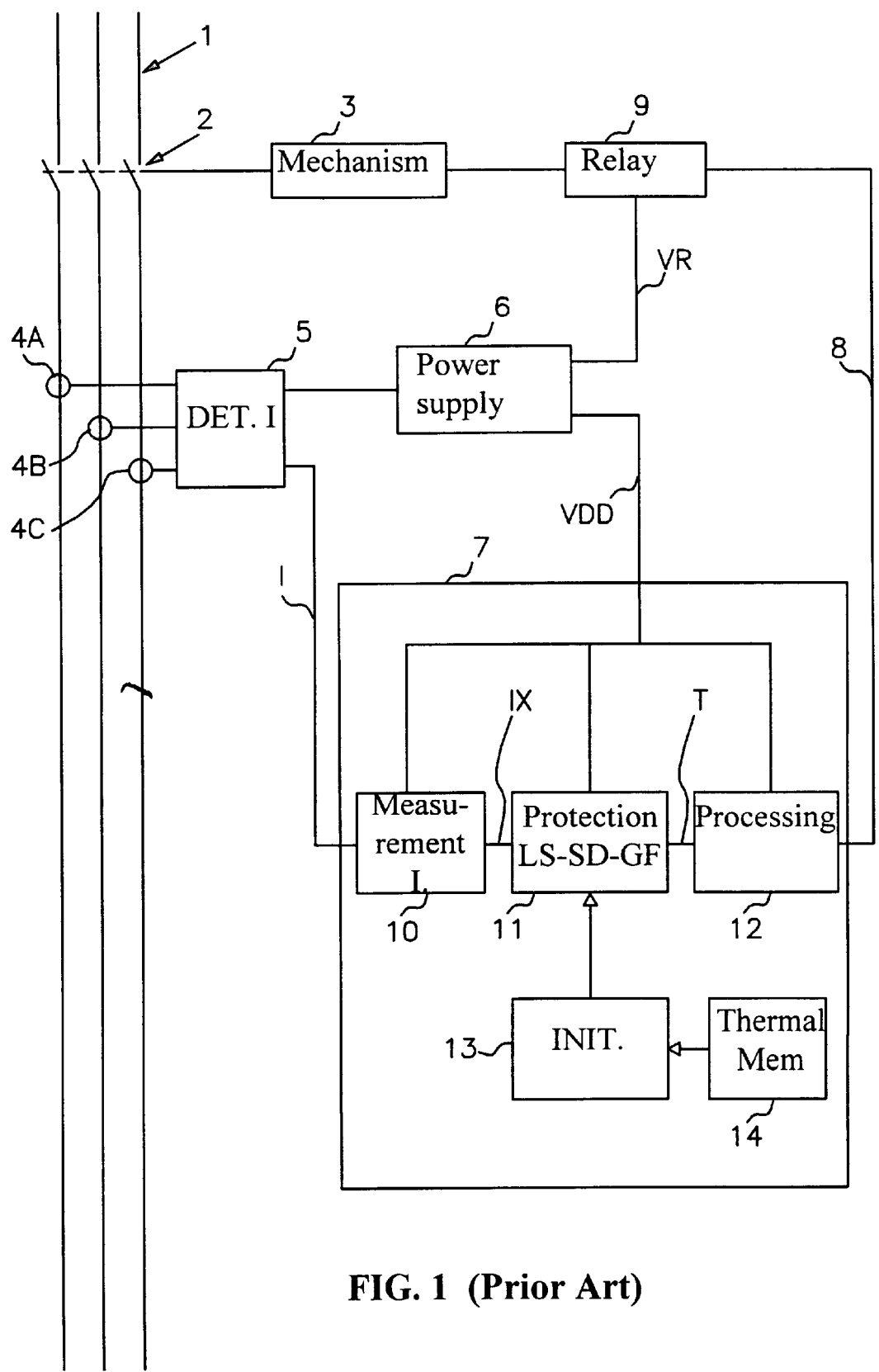
FIG. 1 represents a diagram of a circuit breaker comprising a trip device of the prior art.

The circuit breaker of FIG. 1 protects an electrical power system 1 by opening contacts 2 by means of a mechanism 3. In this circuit breaker, a trip device comprises current sensors 4A, 4B, 4C, associated to conductors of the power system to supply current signals to a detection circuit 5. The circuit 5 supplies an electrical current to a power supply circuit 6 and current signals I representative of the currents flowing in conductors of the power system to a processing unit 7. The processing unit 7 supplies a tripping signal 8 to a relay 9 when the current signals I exceed certain thresholds for preset time durations. The power supply circuit 6 supplies a power supply voltage to the processing unit on a main line VDD, and a relay control voltage VR to the tripping relay. The voltage of VR may be different from the power supply voltage of the main line VDD.

The processing unit 7 comprises a current measuring module 10 receiving the current signals I and supplying current signals IX representative of phase and/or neutral current, and/or a signal representative of earth current to a protection function module 11. Generally the signals supplied to the module 11 are sampled then processed in numerical filters to perform long delay protection, short delay protection and/or earth protection functions. The protection functions supply protection quantity values T to a processing module 12 to process tripping. For example, the values supplied are compared with thresholds to supply a tripping signal 8 when said thresholds are exceeded.

An initialization circuit 13 initializes a thermal or long delay protection function of the module 11 according to the value of the thermal memory supplied by a thermal memory device 14 after tripping.

Trip devices of the prior art do not allow correct initialization in the case of intermittent faults which stop providing a power supply and cause an initialization of the protection functions each time the current returns.

In a trip device according to an embodiment of the invention, an initialization of the protection functions with output quantity values of said protection functions is possible at each current interruption causing a power supply outage. This initialization guarantees a high reliability of the initialized values.

Figure 2:
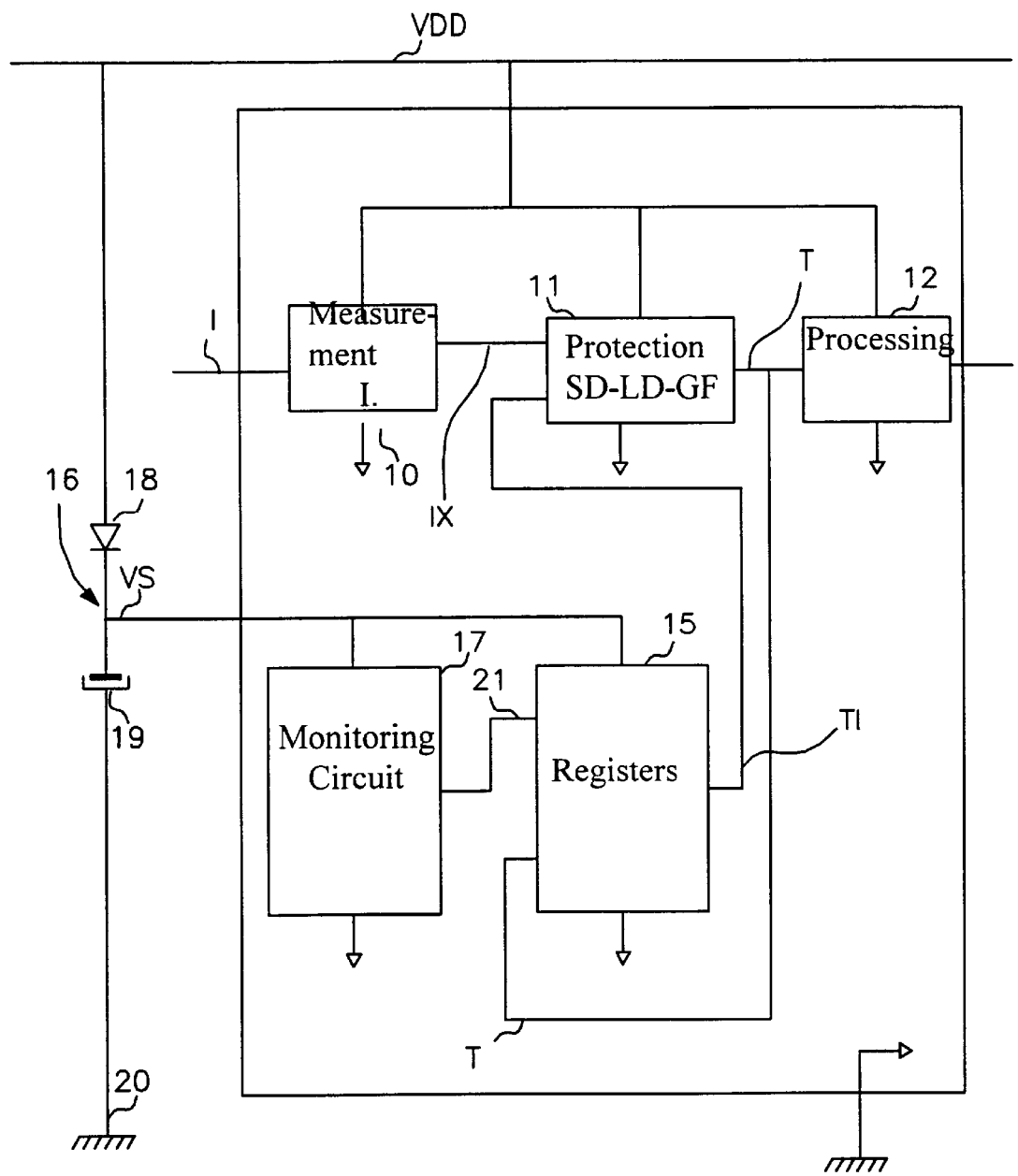
FIG. 2 represents a diagram of a processing unit of a trip device according to an embodiment of the invention.

FIG. 2 shows a diagram of a processing unit of a trip device according to an embodiment of the invention. In this diagram the processing unit comprises means for initialization after interruption. These means comprise at least one back-up register 15 having an input connected to an output of the protection function module 11 to receive values of quantities T, a back-up power supply circuit 16, and a monitoring circuit 17 of the power supply circuit.

The register 15 receives on an input a value of a quantity T of the protection functions. This quantity T can be representative of the thermal state of the long delay protection function and/or of an equivalent tripping variable of the short delay or earth protection functions. The quantity T depends on the value of the input current which undergoes an integration with respect to time according to threshold and time delay setting values.

When initialization is performed, the register supplies a value T1 on an output to an input of the module 11. The value T1 initializes the module 11 to a previous value of T before interruption of the power supply of the main line VDD.

Power supply of the register 15 is performed by the back-up power supply circuit 16 comprising a diode 18 connected between the main line VDD and a back-up power supply line VS and a capacitor 19 connected between the line VS and a reference or ground line 20. The capacitor 19 thus constitutes a back-up power store to supply the register 15 connected to the line VS during a current interruption.

If a current interruption has a very long duration of about several minutes, it is no longer necessary to store and reinitialize quantities T with previous values, in particular the short delay and earth protection functions. In addition, the thermal value of the long delay protection must vary and can be reinitialized by initializations in thermal memory. A too long interruption is liable to discharge the capacitor and affect the register data if the voltage of the line VS drops below the operating voltage of said register.

To guarantee the integrity of the data stored in the register, the monitoring circuit 17 connected to the line VS monitors the supply voltage applied to the register and supplies a reset signal 21 as soon as the voltage on VS is no longer sufficient.

The reset signal 21 deletes the data recorded in the register 15. Thus, when initialization takes place, the protection functions begin with zero values or default values. The data supplied by the register is zero if the power supply VS has dropped or is reliable if the voltage supply was present throughout the current interruption.

The time during which the recorded data is kept is preferably less than one minute and the capacitor 19 preferably has a value less than 50 microfarads (50 $\mu$F). In a preferred embodiment, the data storage time is appreciably 10 seconds and the value of the capacitor 19 is appreciably equal to 4.7 microfarads (4.7 $\mu$F).

Figure 3:
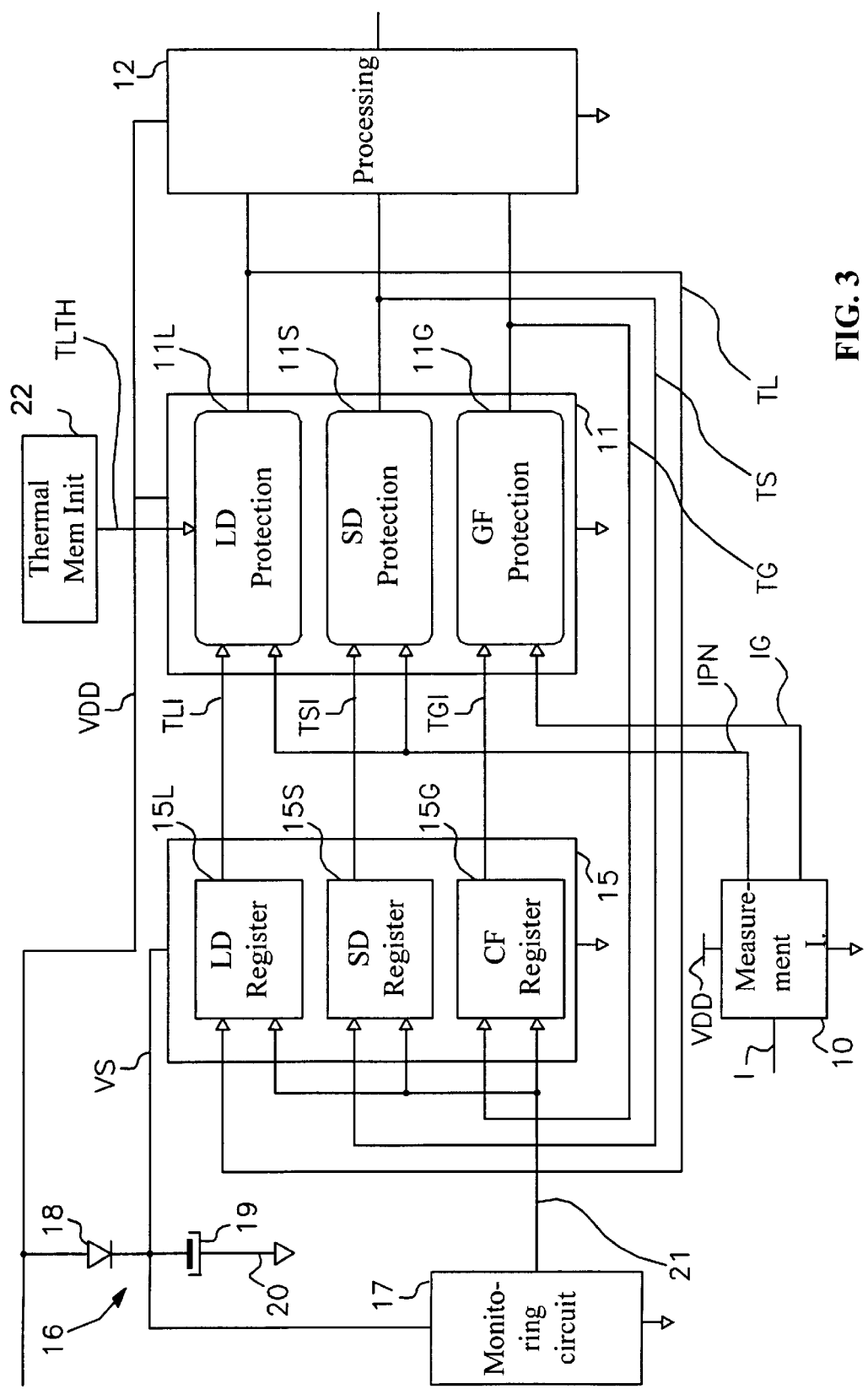
FIG. 3 represents a detailed diagram of a part of a processing unit comprising an initialization device according to an embodiment of the invention.

The diagram of FIG. 3 shows in detail a processing unit of a trip device according to an embodiment of the invention. In this diagram, the measuring module 10 supplies signals IPN representative of phase and neutral currents to a long delay protection function module 11L and a short delay protection function module 11S, and a signal IG representative of a zero-phase sequence or earth fault current to a ground fault protection module 11G.

The modules 11L, 11S and 11G can form part of the module 11. They supply on output respectively a quantity TL representative of the thermal or long delay function, a quantity TS representative of the short delay function, and a quantity TG representative of the ground fault protection function. For example, the values of the quantities TL, TS and TG are increasing if the signals representative of the corresponding currents IPN or IG exceed preset thresholds and are decreasing if said current signals are lower than said thresholds.

Signals representative of quantities TL, TS and TG are applied to the processing module 12 which processes tripping.

The register 15 is composed of three registers 15L, 15S and 15G. A first register 15L receives a value of the quantity TL and supplies an initialization value TL1 to the module 11L. A second register 15S receives a value of the quantity TS and supplies an initialization value TS1 to the module 11S. A third register 15G receives a value of the quantity TG and supplies an initialization value TG1 to the module 11G.

Each register comprises a delete or reset input commanded by the signal 21 of the monitoring circuit 17.

Thus, if the current is interrupted in the conductors, the power supply of the line VDD is also interrupted and the registers keep the values of the quantities TL, TS and TG. If the interruption lasts for example about ten seconds, when initialization is performed the registers will not be deleted and the protection functions will automatically be in the state which they were in before the interruption.

If the interruption lasts several minutes, the registers will be reset to zero and the protection functions will be initialized to default values, for example, with nil values. Even if the interruption lasts for several minutes, in particular after a trip, the long delay protection function can be initialized with a thermal memory value. In FIG. 3, a thermal memory initialization circuit 22 supplies a value TLTH to an input of the long delay protection function module 11L.

The registers perform their store function, whatever the cause of the current interruption, for example an intermittent fault, tripping of a circuit breaker, or when switches or contacts are operated on the power system.

For example, the long delay protection function can be initialized prioritarily by the value of the register if the data is valid with non-nil values or with a thermal memory value if the values are nil.

In another embodiment, it is advantageous to choose whichever is the higher value between the value stored in the register and a thermal memory value.

What is claimed is:

1. An electronic trip device comprising:

a processing unit receiving current signals representative of currents flowing in a power system to be protected, comprising protection means and supplying a tripping signal when said currents exceed preset tripping values, and an initialization device for initialization of said processing unit comprising means for initialization after an interruption, said means for initialization after an interruption comprising:

at least one storage register connected to the protection means to store a value of at least one quantity of a protection function and to supply a value of said at least one quantity when initialization of the processing unit is performed, a back-up power supply circuit to supply power to said at least one storage register, and monitoring means for monitoring the back-up power supply circuit connected to an input of said at least one storage register to reset the value of the register to zero when a voltage of the back-up power supply circuit drops below a preset threshold.

2. The trip device according to claim 1, wherein the means for initialization after an interruption comprise a first storage register connected to the protection means and to the monitoring means to store a value of a quantity representative of a short delay protection function.

3. The trip device according to claim 1, wherein the means for initialization after an interruption comprise a second storage register connected to the protection means and to the monitoring means to store a value of a quantity representative of an earth protection function.

4. The trip device according to claim 1, wherein the means for initialization after an interruption comprise a third storage register connected to the protection means and to the monitoring means to store a value of a quantity representative of a long delay protection function.

5. The trip device according to claim 1, wherein the protection means, at least one storage register, and the monitoring means for monitoring a power supply circuit are arranged in a single integrated circuit.

6. The trip device according to claim 1, wherein the back-up power supply circuit comprises a diode connected between a main power supply line and a back-up power supply line, and a capacitor connected between the back-up power supply line and a reference line.

7. The trip device according to claim 1, wherein the initialization device comprises means for initialization after an interruption and means for initialization after tripping.

* * * * *